United States Patent [19]
Loiacono

[11] Patent Number: 6,042,384
[45] Date of Patent: Mar. 28, 2000

[54] COMPUTERIZED SYSTEMS FOR OPTICALLY SCANNING AND ELECTRONICALLY SCORING AND REPORTING TEST RESULTS

[75] Inventor: Ronald Loiacono, Salinas, Calif.

[73] Assignee: Bookette Software Company, Monterey, Calif.

[21] Appl. No.: 09/106,958

[22] Filed: Jun. 30, 1998

[51] Int. Cl.[7] .................................................. G09B 3/00
[52] U.S. Cl. .......................... 434/322; 434/323; 434/326
[58] Field of Search ................................... 434/322, 323, 434/326, 327, 335, 346, 347, 354, 362, 363, 358

[56] References Cited

U.S. PATENT DOCUMENTS

| | | | |
|---|---|---|---|
| 4,978,305 | 12/1990 | Kraft | 434/358 X |
| 5,204,813 | 4/1993 | Samph et al. | 434/323 X |
| 5,452,379 | 9/1995 | Poor | 382/317 |
| 5,584,699 | 12/1996 | Silver | 434/322 X |
| 5,672,060 | 9/1997 | Poor | 434/322 |
| 5,752,836 | 5/1998 | Clark et al. | 434/322 |
| 5,788,508 | 8/1998 | Lee et al. | 434/323 X |
| 5,820,386 | 10/1998 | Sheppard, II | 434/323 X |
| 5,827,070 | 10/1998 | Kershaw et al. | 434/322 |
| 5,833,470 | 11/1998 | Harrison et al. | 434/323 |
| 5,842,869 | 12/1998 | McGregor et al. | 434/323 X |

*Primary Examiner*—Sam Rimell
*Attorney, Agent, or Firm*—Maurice M. Klee

[57] ABSTRACT

Computerized systems for optically scanning "bubble" sheet responses to test questions and then electronically scoring and reporting test results are provided. The systems employ templates which contain (a) computer readable images of the test questions and (b) overlay records which contain (i) the coordinates of icons representing the possible answers to the questions and (ii) an identification of the correct answers. The templates are merged with the scanned "bubble" sheet responses and the results displayed on a video monitor as if the test had been administered on a computer, rather than through the use of a "bubble" sheet. The templates minimize the amount of computer storage space required to produce the video display of the test results.

10 Claims, 21 Drawing Sheets

FIG. 1

Mathematics Assignment 1

1. Add:  4,387
            3,294
         + 7,631 a) 15,312
   b) 15,302
   c) 14,102
   d) 14,112

2. Add: $4\frac{5}{8} + 6\frac{3}{8} =$ a) 11
   b) $10\frac{7}{8}$
   c) $10\frac{1}{4}$
   d) 10

3. Add: $4^2 + 3 =$ a) 7
   b) 11
   c) 19
   d) 23

4. Subtract:  5,018
             − 259 a) 4,859
   b) 5,241
   c) 4,759
   d) 4,769

FIG. 2

Mathematics Assignment 1

1. Add
$$\begin{array}{r} 4,387 \\ 3,294 \\ +7,631 \\ \hline \end{array}$$
   a) 15,312
   b) 15,302
   c) 14,102
   d) 14,112

2. Add  $4\frac{5}{8} + 6\frac{3}{8} =$
   a) 11
   b) $10\frac{7}{8}$
   c) $10\frac{1}{4}$
   d) 10

3. Add  $4^2 + 3 =$
   a) 7
   b) 11
   c) 19
   d) 23

4. Subtract
$$\begin{array}{r} 5,018 \\ -259 \\ \hline \end{array}$$
   a) 4,859
   b) 5,241
   c) 4,759
   d) 4,769

FIG. 5

Book Wizard     Page 1 of 1

Mathematics Assignment 1

1. Add     4,387
            3,294
          + 7,631

[A] 15,312
    [B] 15,302
    [C] 14,102
    [D] 14,112

2. Add     $4\frac{5}{8} + 6\frac{3}{8} =$ a) 11
    b) $10\frac{7}{8}$
    c) $10\frac{1}{4}$
    d) 10

3. Add     $4^2 + 3 =$ a) 7
    b) 11
    c) 19
    d) 23

4. Subtract     5,018
               − 259 a) 4,859
    b) 5,241
    c) 4,759
    d) 4,769

FIG. 6

Mathematics Assignment 1

1. Add
   4,387
   3,294
   + 7,631

A  15,312
   B  15,302
   C  14,102
   D  14,112

2. Add    $4\frac{5}{8} + 6\frac{3}{8} =$

A  11
   B  $10\frac{7}{8}$
   C  $10\frac{1}{4}$
   D  10

3. Add:   $4^2 + 3 =$

A  7
   B  11
   C  19
   D  23

4. Subtract    5,018
                − 259

| Verify Scanning Results | | | |
|---|---|---|---|
| ID | Name | Status | Score |
| 3 | MATZ EDDY | ID not found | No |
| 06 | Kevin LeMoore | Assigned | Yes |
| 07 | Margaret Neilson | Assigned | Yes |
| 08 | Oscar Perez | Assigned | Yes |
| 09 | Rachel Simpson | Assigned | Yes |
| 10 | Tyler Viray | Assigned | Yes |
| 01 | Alicia Bardin | Assigned | Yes |
| 02 | Christopher Davis | Assigned | Yes |
| 04 | Gregory Hill | Assigned | Yes |
| 05 | Ilene Johnson | Assigned | Yes |

Modify  Remove  Save  Cancel

| Verify Scanning Results | | | |
|---|---|---|---|
| ID | Name | Status | Score |
| 03 | Eddy Matz | Assigned | Yes |
| 06 | Kevin LeMoore | Assigned | Yes |
| 07 | Margaret Neilson | Assigned | Yes |
| 08 | Oscar Perez | Assigned | Yes |
| 09 | Rachel Simpson | Assigned | Yes |
| 10 | Tyler Viray | Assigned | Yes |
| 01 | Alicia Bardin | Assigned | Yes |
| 02 | Christopher Davis | Assigned | Yes |
| 04 | Gregory Hill | Assigned | Yes |
| 05 | Ilene Johnson | Assigned | Yes |

Modify  Remove  Save  Cancel

COMPUTERIZED SYSTEMS FOR OPTICALLY SCANNING AND ELECTRONICALLY SCORING AND REPORTING TEST RESULTS

FIELD OF THE INVENTION

This invention relates to computerized systems for scoring instructional, tutorial, and testing materials (hereinafter referred to collectively as "tests") and reporting the results to a user who may be a student, parent, or teacher.

More particularly, the invention relates to computerized systems which optically scan bubble-format answer results, score the scanned results, and merge the scored results into an electronic image of the test document for presentation (reporting) to the user.

BACKGROUND OF THE INVENTION

Beginning in the 1960's, technology has been developed to machine score optically-scanned answer documents. Although the hardware has improved over the years, the basic approach has not changed. Students respond to multiple choice questions by completely filling in "bubbles" on a machine scannable answer document using a "number two" pencil. When the document is scanned, the hardware (scanner) identifies the dark mark for each question and electronically stores the student's responses.

As scanners and computer hardware have become more affordable, this technology has been implemented in most school districts throughout the country. Inexpensive commercial software packages are now available to operate the scanners and their associated microcomputers. Two of the most commonly used software packages are SCANTOOLS from National Computer Systems (Minneapolis, Minn.) and BASIC SCRIPT from Scantron Corporation (Tustin, Calif.).

This approach to test administration has proved to be very cost effective since thousands of answer sheets can be processed and scored quickly and automatically. However, students are unable to review the scored exam since the actual test is kept blank with the selected answers only appearing on the "bubble" sheet. Since feedback is an important aspect of the learning process, this inability to meaningfully review test results has represented a serious deficit in the art.

In response to this need, a new technology has begun to evolve whereby test documents, instead of "bubble" sheets, are scanned and the entire image of each test page is stored as a graphical bitmap. After scanning, the completed exam is scored by the instructor on the computer and can then be viewed by the student, thus providing the desired feedback. Unfortunately, this technology requires an enormous amount of disk space since each page of each exam for each student is stored as a graphic. In addition, it takes much more time to scan an entire test document than to scan a one page answer document. And, after the documents have been captured and stored on disk, the tests must be manually reviewed and manually scored by the instructor.

What has been missing in the art is an efficient technology that retains the advantages of scanning a "bubble" sheet and yet allows students to review their responses and obtain feedback in a meaningful manner. The present invention is directed to solving this important problem in the art.

SUMMARY OF THE INVENTION

In view of the foregoing, it is an object of the present invention to provide computerized systems for optical scanning student responses to a test and displaying those responses in association with the original test questions without the need for excessive amounts of computer storage space. It is also an object of the invention to provide automatic scoring of student tests in such a system.

The invention achieves these and other objects by scanning student responses on "bubble" sheets using conventional scanning technology, automatically scoring the scanned responses, and porting the scored and scanned responses into an electronic template of the test document. The template contains the test questions, the possible responses to the questions, the coordinates of identifying icons for the possible responses, and the correct response for each question.

During the porting, the test document template and the scanned and scored responses from a selected student are merged and displayed or printed as if the student had taken the exam directly on the computer. In addition, the test document is displayed as if it had been graded by the teacher with, for example, circles indicating the correct answers for those questions which the student got wrong.

By means of the common template, tremendous savings in storage space are achieved. Moreover, since the student responses are still scanned in, this savings is achieved without losing the advantages of the "bubble" sheet approach to administering tests to large numbers of students. By the combination of these factors, the invention provides the art with an efficient method for administering numerous tests to numerous students using generally available and reasonably priced optical scanners and computer hardware.

BRIEF DESCRIPTION OF THE DRAWINGS

FIG. 1 shows an example of test questions which can be used in the practice of the invention.

FIG. 2 shows an example of a "bubble" sheet for use in practicing the invention.

FIGS. 3–8 and 18–20 illustrate various screen displays generated during the practice of the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to an efficient procedure for integrating conventional "bubble" sheet administration of tests with computerized grading and reporting of test results.

Figure 2:
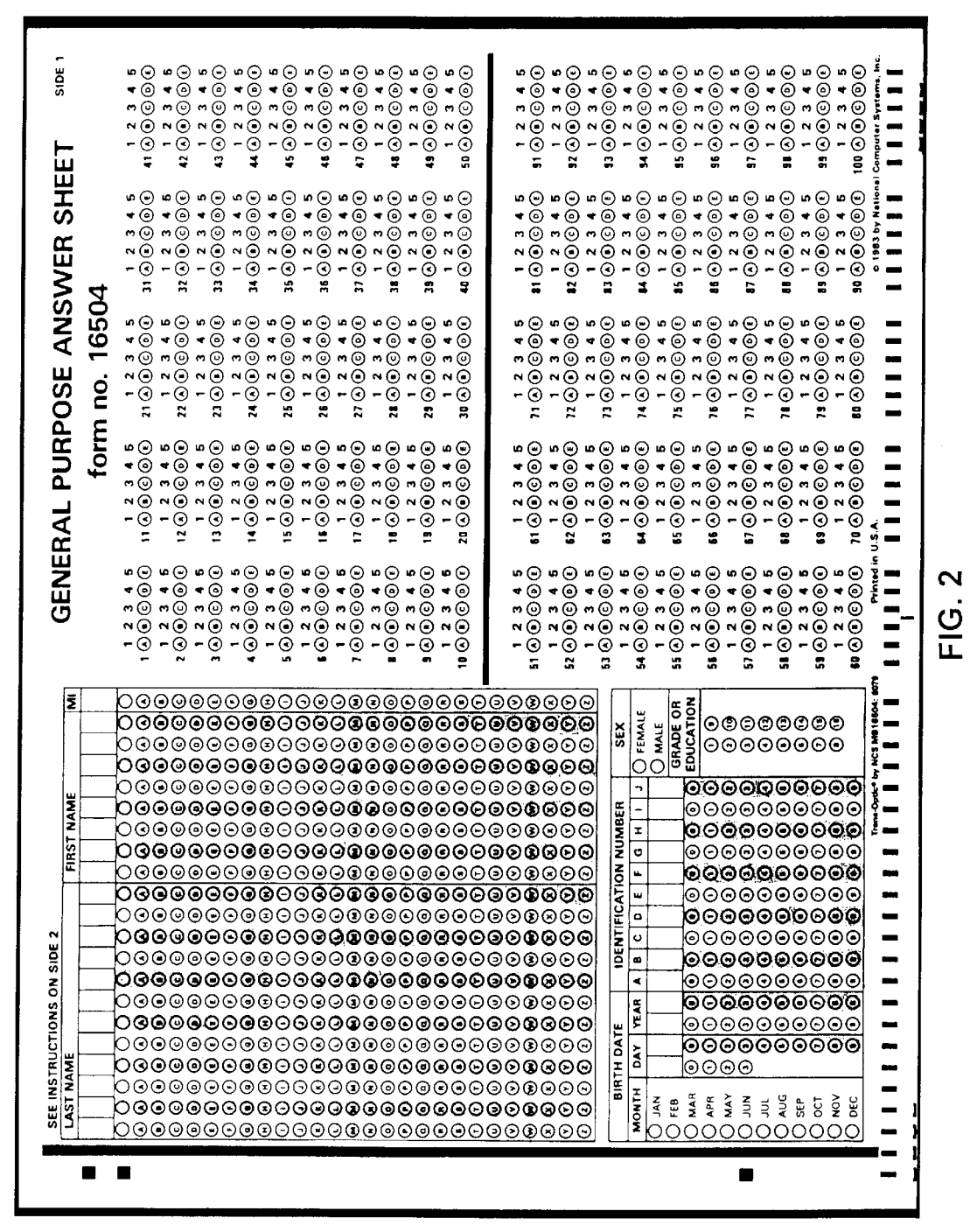

FIGS. 1 and 2 illustrate a representative set of test questions and a representative "bubble" sheet, both of which are used by the student in the conventional way. Thus, the student answers questions 1 through 4 of FIG. 1 by filling in "bubbles" on the corresponding lines of the "bubble" sheet of FIG. 2. The student also provides the identification information called for by the left hand portion of the sheet, again by filling in "bubbles". Thereafter, the sheet is scanned using a conventional scanner, with the student's answers being stored in the student's record in a student database maintained by the teacher, the school, and/or the school district.

Figure 3:
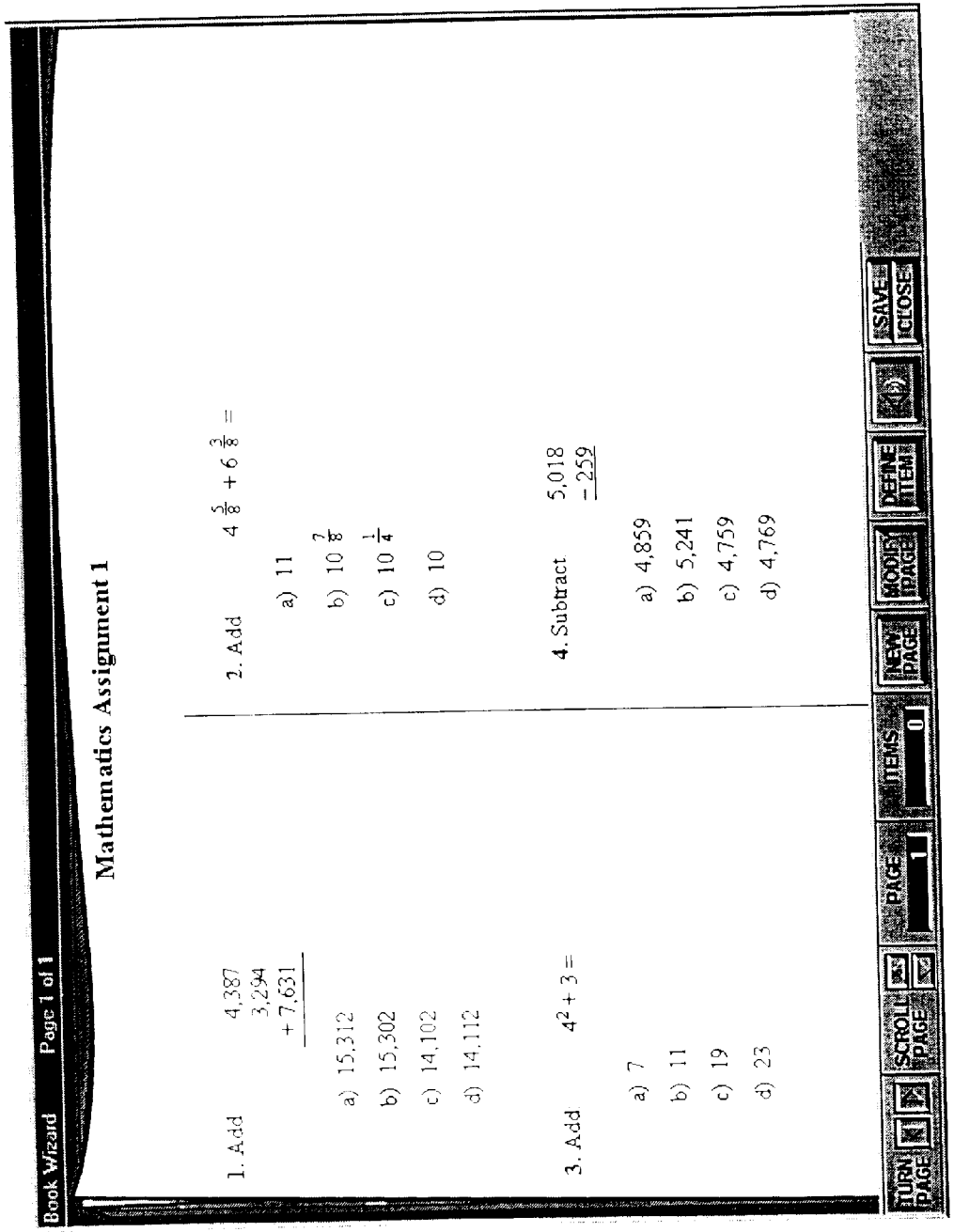

FIGS. 3–6 illustrate the preparation of a template for the questions of FIG. 1. In particular, FIG. 3 shows the questions of FIG. 1 displayed on a video screen. As can be seen in this figure, the questions are now surrounded by computer screen borders which contain tool bars by which the user can interact with the image on the screen.

Figure 9:
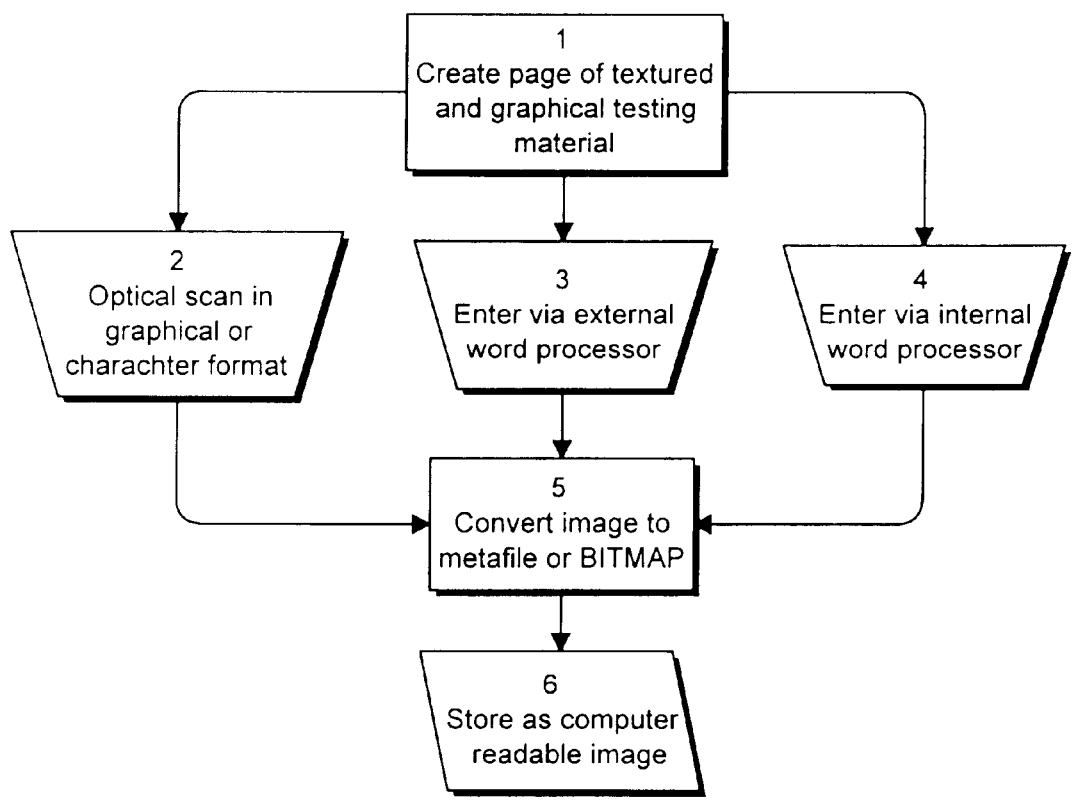
FIGS. 9–17 and 21 are flow charts illustrating procedures for practicing various steps of the invention.

The display of FIG. 3 is obtained by producing a computer readable image of the test questions. FIG. 9 shows this portion of the process in flow chart form. As shown therein, if the test questions originally existed in paper and pencil form, the computer readable image can be produced by scanning questions into a computer system, e.g., by means of conventional scanning equipment and software. The computer readable image is preferably in a bitmap (BMP) format or an equivalent graphical format which is device independent, i.e., a format which can be used with a variety of screen resolutions.

Alternatively, the test questions might originally exist as an electronic document created using a stand-alone (external) word processor, such as, MICROSOFT WORD, LOTUS WORDPRO, or the like. Such stand-alone word processors normally support the clipboard function so that a computer readable image can be produced by blocking the test questions and copying them to the clipboard. Preferably, the image copied to the clipboard is in a Metafile format. Alternatively, the format at the clipboard, e.g., a rich text format (RTF) format, can be converted to, for example, a Metafile format, by reading the RTF clipboard image into an intermediate file and then converting to a Metafile format which will then constitute the computer readable image used in later steps of the invention. Although the Metafile format is preferred because it presently constitutes an industry standard, other computer readable formats or formatting procedures now known or subsequently developed can be used in the practice of the invention, e.g., the OLE embedded document procedure.

Rather than a stand-alone word processor, the test questions can be produced by a specialized (internal) word processor. As with the stand-alone word processor, the specialized word processor should be capable of producing a computer readable image. This can be done in a manner invisible to the user by means of the clipboard function or in other ways known in the art, e.g., using a software development kit (SDK) for programming in WINDOWS which contains the appropriate Metafile commands.

However the computer readable image is generated, the next step in the process is to define screen coordinates for identifying icons for the possible responses to the questions and to store those coordinates in an overlay record. For purposes of illustration, the icons will be assumed to be "boxes" which surround the letter identifiers for the possible answers to the questions, it being understood that other icons can be used if desired.

Figure 4:
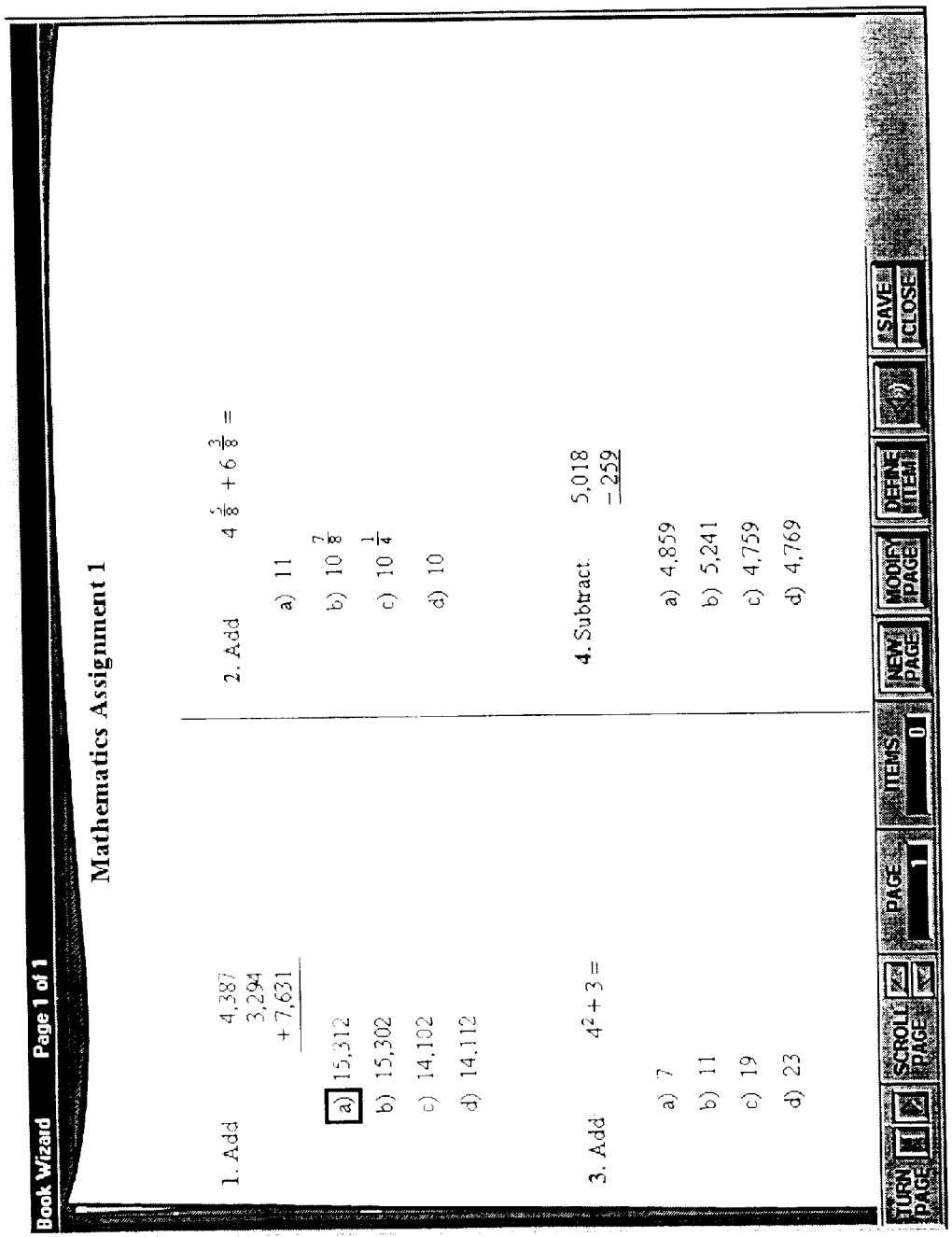
Figure 10:
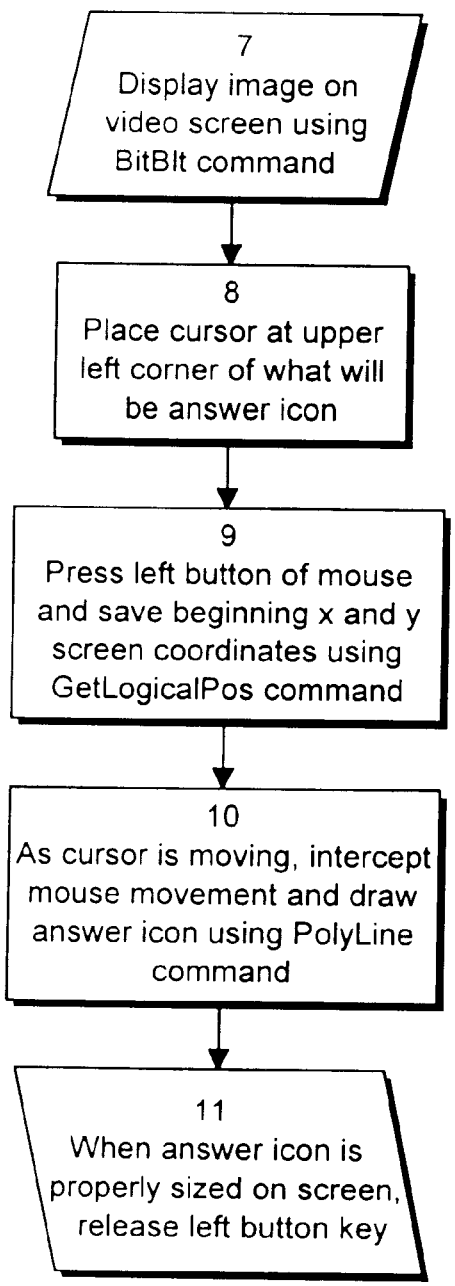
Figure 11:
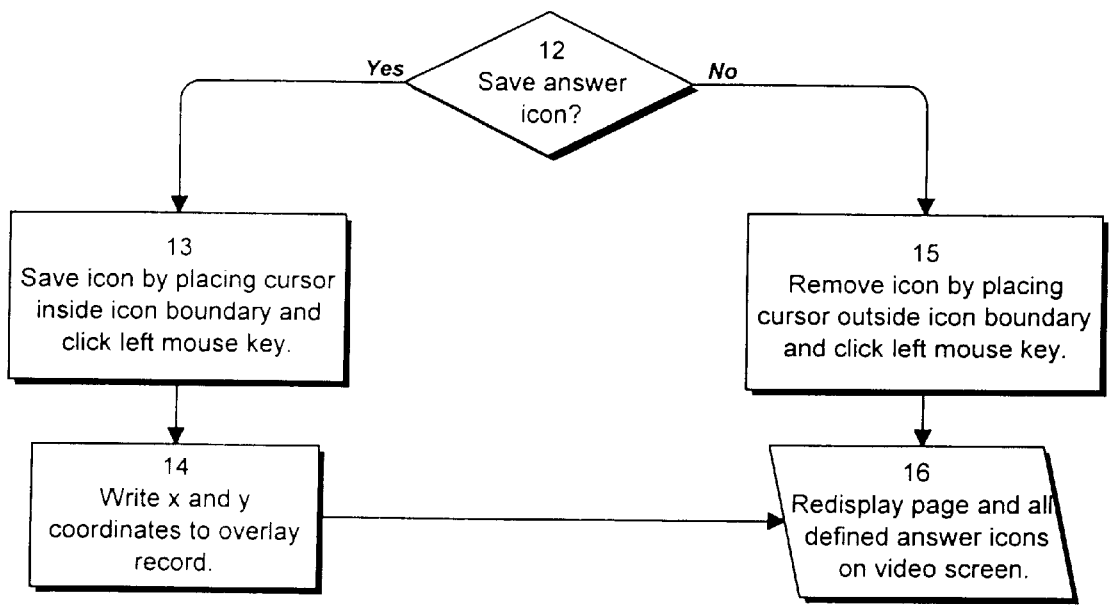
Figure 12:
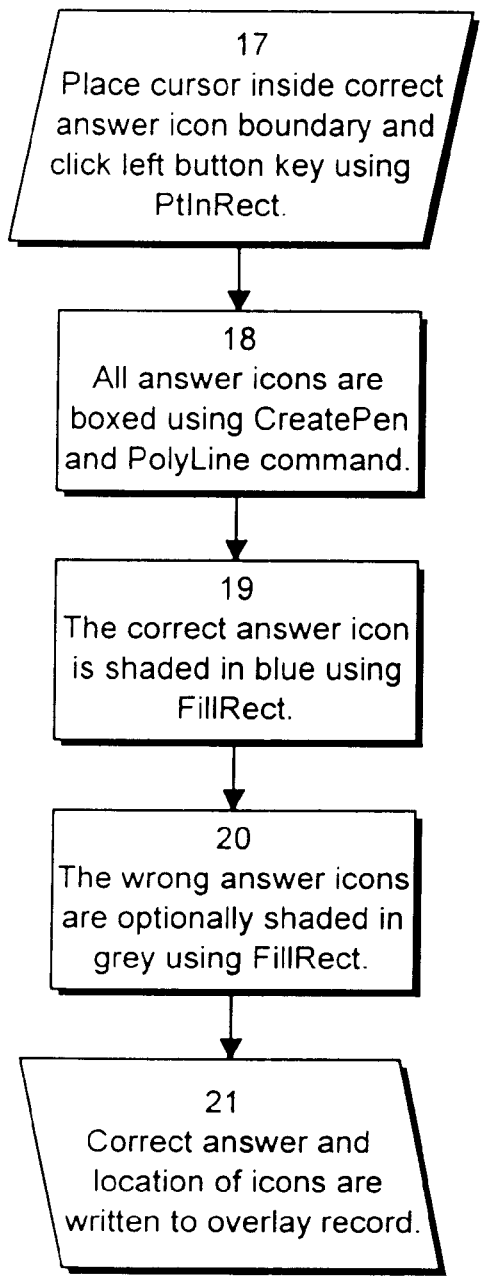
Figure 13:
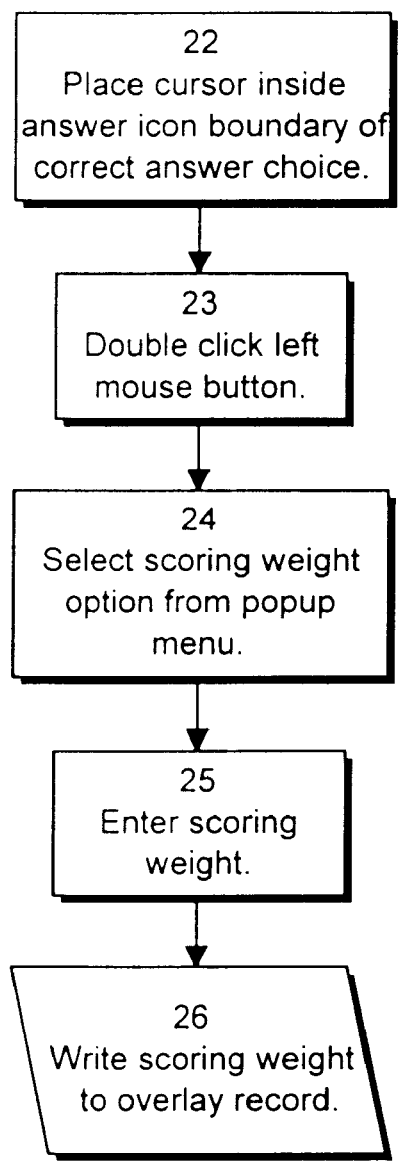
Figure 14:
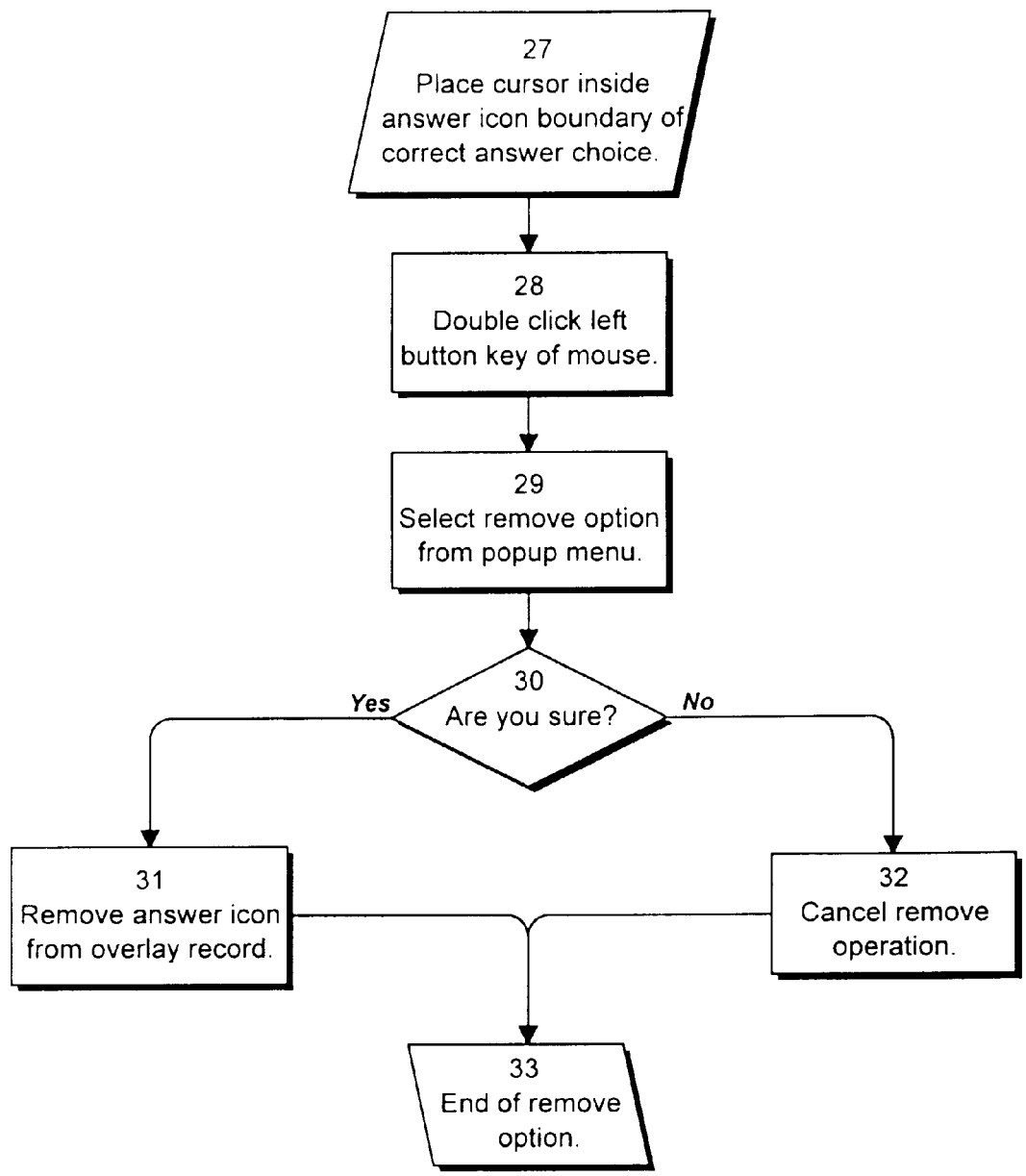
Figure 15:
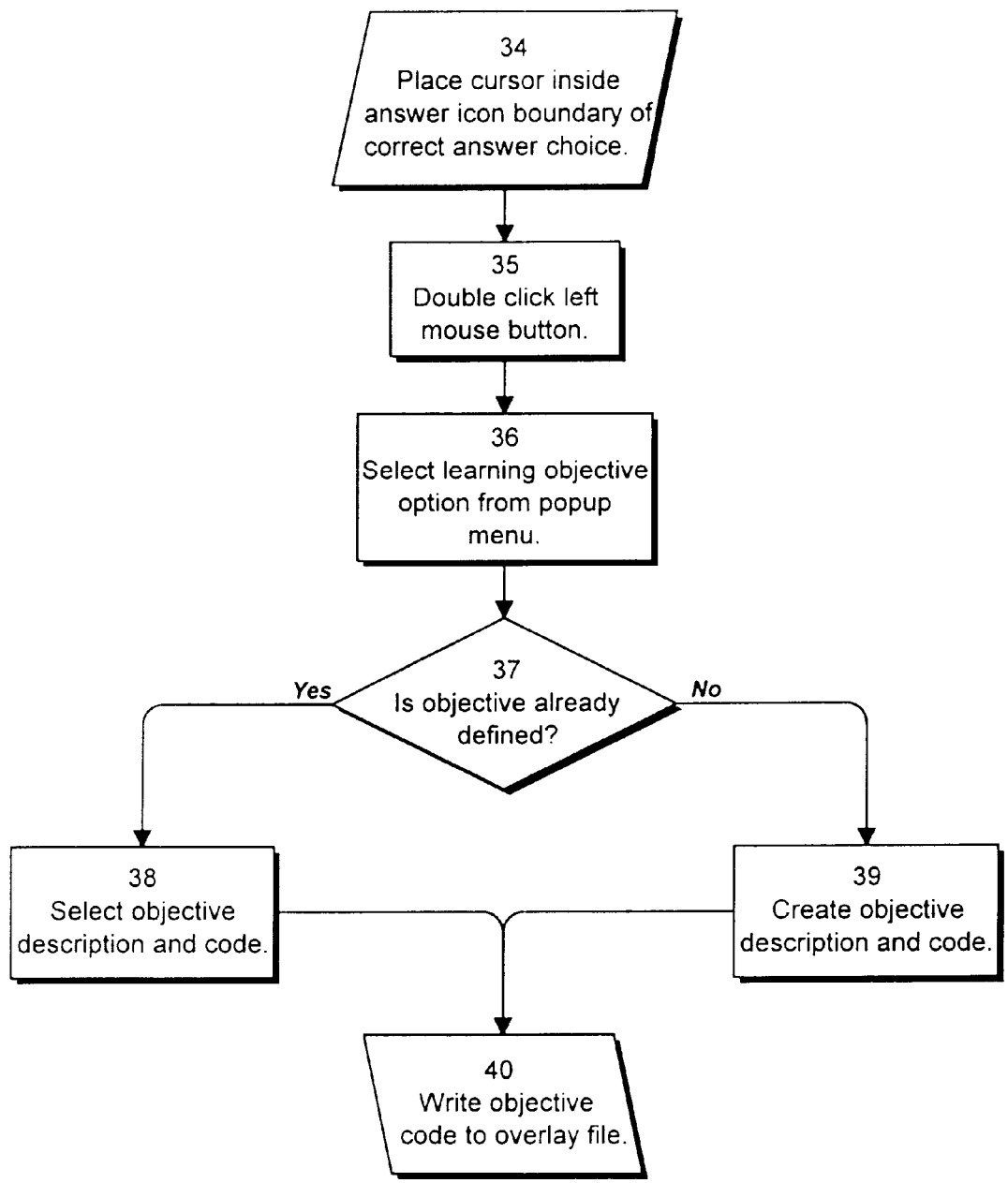

The screen displays of FIGS. 4–5 and the flow charts of FIGS. 10–11 illustrate this portion of the process. As shown therein, the user (e.g., the teacher) places the computer's cursor at the upper left corner of what will become the icon using a pointing device (e.g., a mouse) and presses the left button or key of the mouse to save the screen coordinates of that point. While holding the left button down, the user moves the cursor to produce the icon and then releases the button. As shown in FIG. 11, the location of the icon is then saved to the overlay record by placing the cursor inside the icon and clicking the left button. Alternatively, the icon can be removed by clicking the left button with the cursor outside the icon.

As shown in FIG. 5, this process is repeated until an icon is associated with each of the possible answers and the coordinates of each icon is stored in the overlay record.

The next portion of the process involves identifying the correct answer and optionally associating a scoring weight and/or a learning objective with the correct answer. The screen display of FIG. 6 and the flow charts of FIGS. 12–15 illustrate these procedures. As shown therein, the correct answer is identified by placing the cursor within the icon for that answer and clicking the left button. Once the correct answer has been identified, double clicking the left mouse button within the correct answer icon brings up a pop-up menu (not shown) which allows a scoring weight (FIG. 13) and/or a learning objective code (FIG. 15) to be assigned. The pop-up menu also includes a "remove" option (FIG. 14) which allows the user to correct any errors which may have been made in identifying correct answers and/or assigning scoring weights or objective codes. Like the coordinates of the icons, the results of these operations are stored in the overlay record.

FIG. 7 shows the final result of the template preparation process for the questions of FIG. 1. As shown therein, an icon has been applied to each possible answer and the correct answers have been identified by, for example, shading. The combination of the computer readable image of the test questions and the overlay record constitutes the template which is used in the subsequent steps of the process, i.e., in scoring and displaying the student's "bubble" sheet responses to the test.

The template can be stored in the user's computer system in various ways. A preferred storage strategy comprises storing the computer readable image of the test in its original form, e.g., as a Metafile, as one record of a file and storing the screen coordinates for the icons, the correct answers, and the optional scoring weights and instructional objectives as a separate record in the same file. Other storage approaches can, of course, be used if desired. Whatever approach is used, the storage requirements are clearly minimized by the template approach of the invention since only one computer readable image for each page of test questions needs to be stored and the overlay record for that page, being limited to the minimum amount of information needed to score and display students' responses, is very small.

Figure 16:
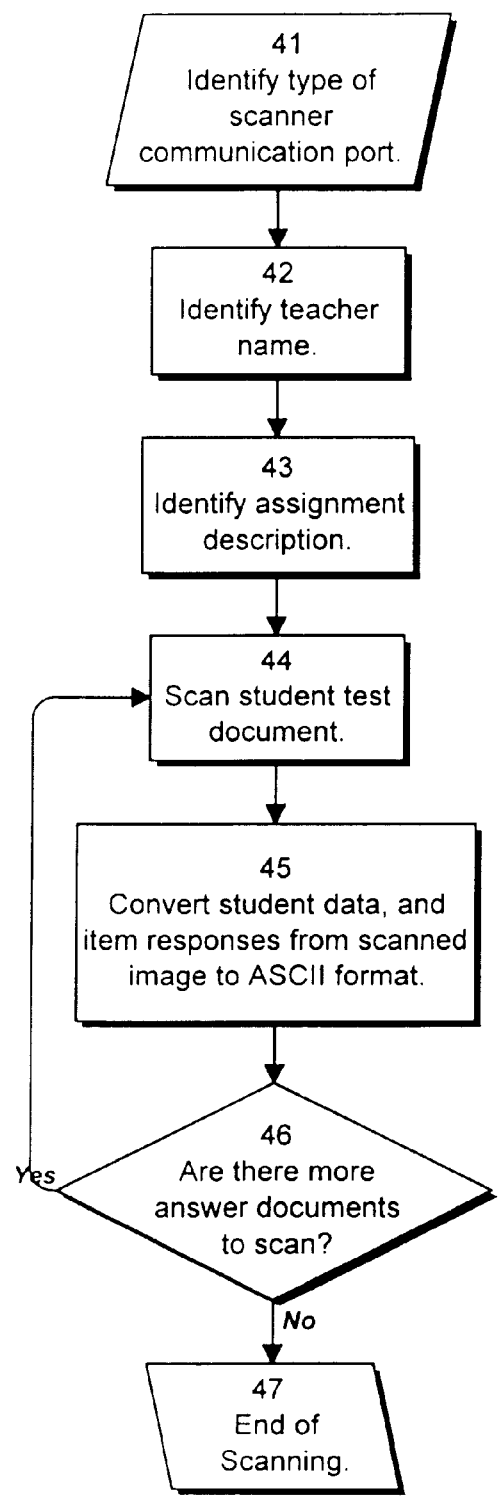
Figure 17:
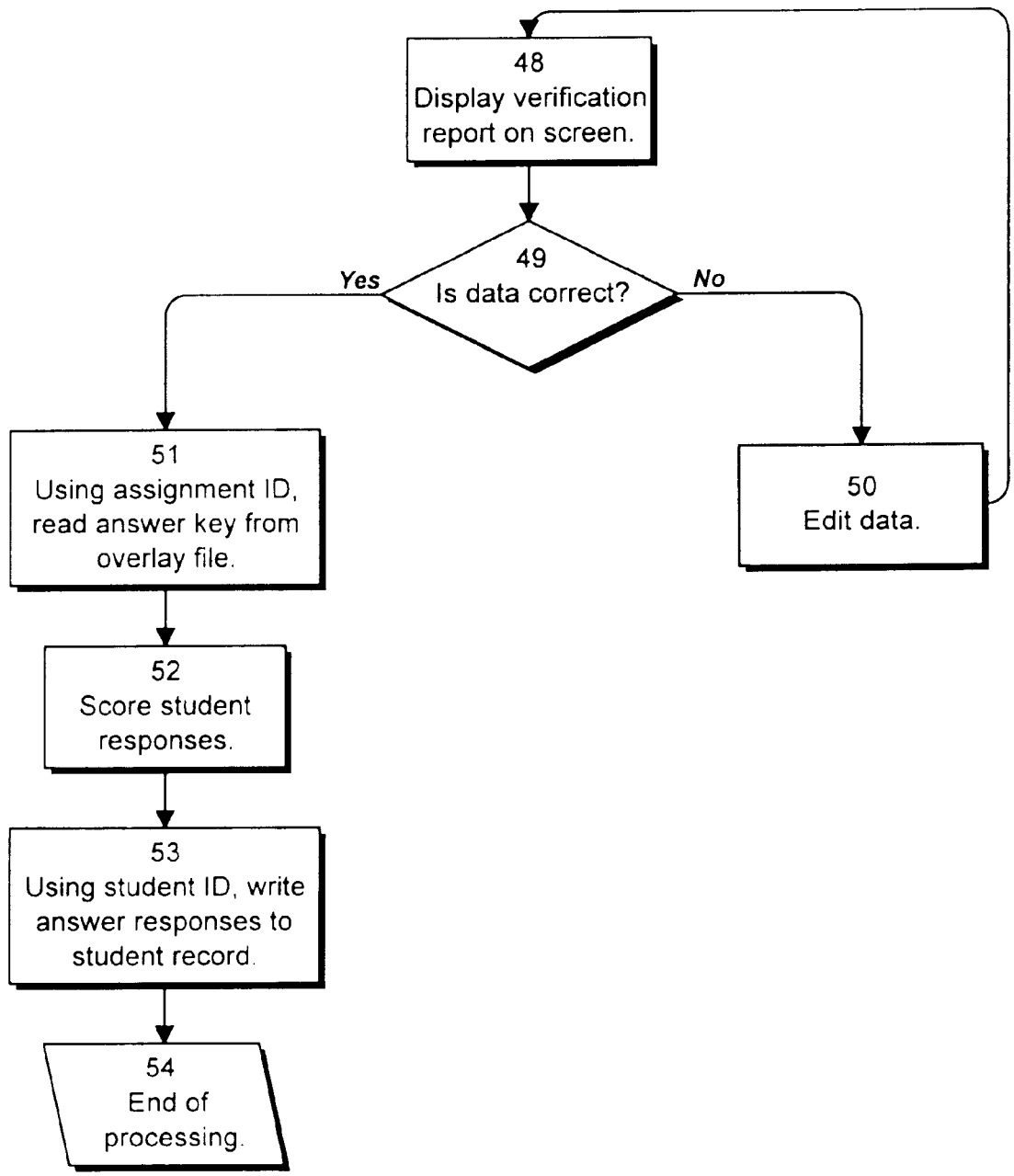

FIGS. 16–20 illustrate the scanning aspects of the invention. In particular, FIG. 16 illustrates a suitable procedure for scanning "bubble" sheets and FIG. 17 illustrates a procedure whereby the user (e.g., the teacher) can verify that the scanned student identification information is correct before student responses are stored in the student records in the student database.

Figure 19:
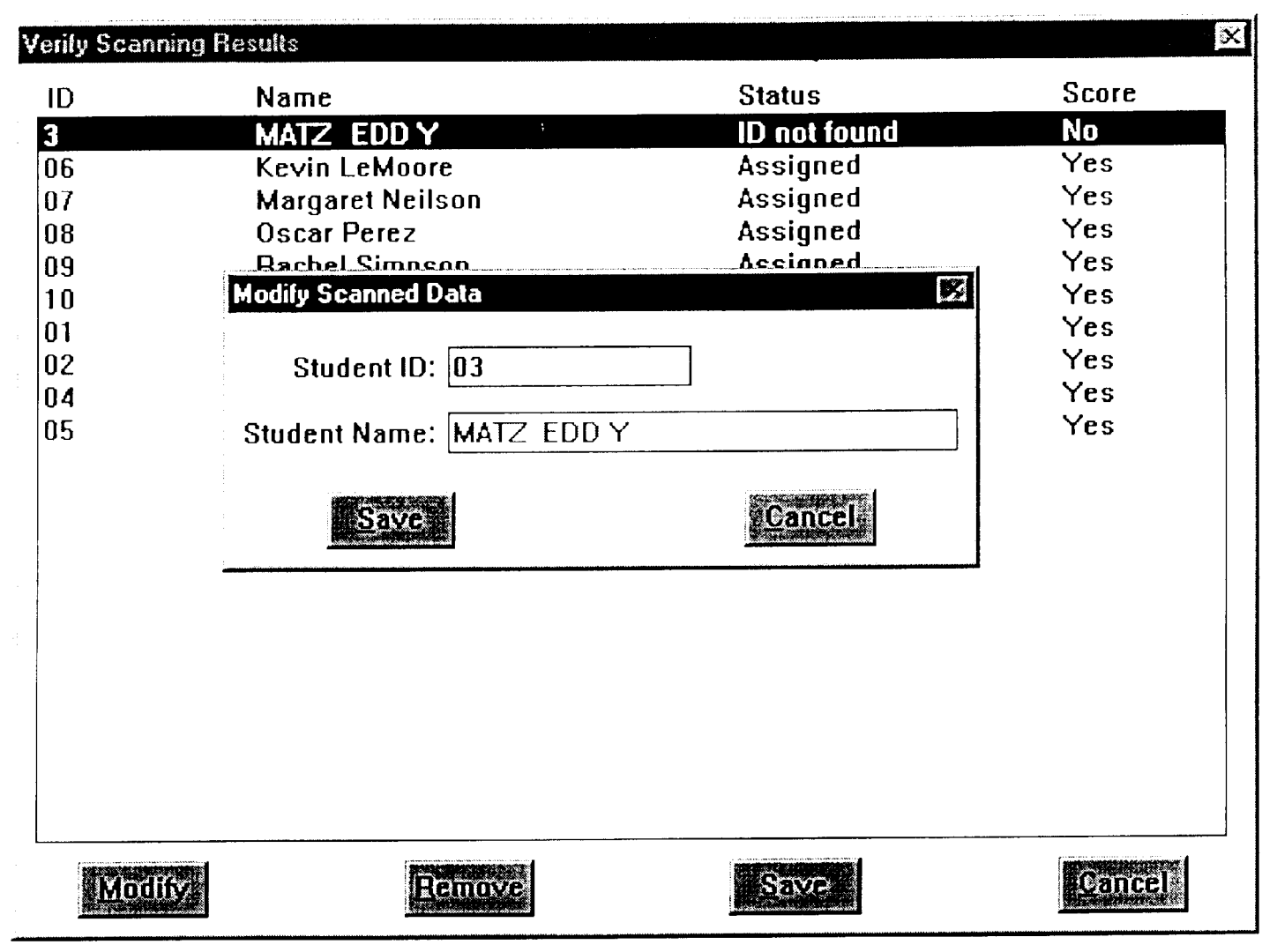

The screen displays of FIGS. 18–20 illustrate the correction of scanned identification data by means of a pop-up dialog box which is accessed by first clicking on the row for the student whose identification information is to be corrected and then clicking on the "modify" button at the bottom screen border. Using this pop-up box, the user can enter the correct student identification information and can then save that information using the "save" button of that box. The corrected version of the student identification information of FIG. 18 is shown in FIG. 20.

The "remove" button on the bottom border of FIGS. 18–20 is used to completely delete a row of information as may be required in the case of a double scan of a "bubble" sheet. The "save" button of the bottom border stores the student's responses in the student records in the student database when the verification process has been completed.

Figure 8:
Figure 21:
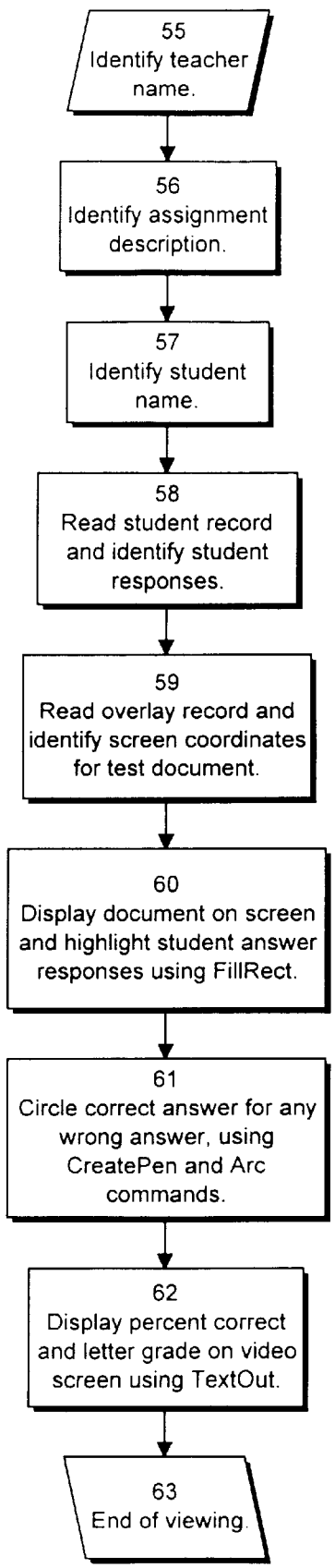

FIGS. 8 and 21 illustrate the final steps of the process. Here a user (e.g., a student) has logged onto the system and has requested to see the results of the bubble test of FIG. 1. Using the computer readable image of the test, the overlay record, and the student's record which contains the results of scanning the "bubble" sheet responses, the original test questions with the student's answers highlighted are displayed to the user. If the student has made any mistakes, the correct answer is shown by, for example, a circle within the icon for the correct answer. In addition, grading is performed and also displayed (see the upper right corner of the screen display of FIG. 8).

Thus, as shown in FIG. 8, the invention bridges the gap between "bubble" sheet testing and student feedback. Significantly, through the use of templates, this feedback is provided with a minimum of computer storage space, thus allowing the techniques of the invention to be widely used by testing and educational institutions.

The process of the invention is practiced on a digital computer system configured by suitable programming to perform the various operational steps.

The computer system can comprise a general purpose computer and its associated peripherals, such as the multimedia personal computers and peripherals currently being sold by Dell, Gateway, Compaq, Texas Instruments, Apple, IBM, Hewlett-Packard, and the like. Preferably, the computer system should include at least 4 megabits of RAM, a color monitor having at least VGA graphics, at least 10 megabytes of disk storage, and a 486 or higher processor, e.g., a PENTIUM processor.

The system also includes an optical scanner and associated software for scanning "bubble" sheets and for inputting other "paper and pencil" type materials and may also include a CD-ROM drive, as well as capabilities for creating a CD-ROM master.

The system's basic software preferably includes an operating system of the graphical type, e.g., a WINDOWS or MACINTOSH type system, which supports input through a mouse, a word processing program, a spreadsheet program, a graphics program, and programs which support audio and video input and output.

Software embodying the process of the invention can be written in various programming languages known in the art. A preferred programming language is the C language which is particularly well-suited to a graphical operating environment. Other languages which can be used include VISUAL BASIC, PASCAL, C++, and the like.

For purposes of distribution and use, software written to practice the invention can be embodied as an article of manufacture comprising a computer usable medium, such as a magnetic disc, an optical disc, or the like, upon which the software is encoded.

In certain of its aspects, e.g., the preparation of templates, the present invention employs procedures of the type disclosed in co-pending and commonly assigned U.S. patent application Ser. No. 08/896,226, entitled "Computerized Systems for Producing On-Line Instructional Materials," the contents of which in their entirety are incorporated herein by reference.

Although specific embodiments of the invention have been described and illustrated, it is to be understood that modifications can be made without departing from the invention's spirit and scope.

For example, the layout of the various screen displays, the types of answer icons, and the specific shapes of the answer icons can be changed without departing from the invention. Similarly, the specific procedures discussed for interacting with the computer readable image, e.g., moving and clicking with a mouse, are not intended to limit the scope of the invention. Along the same lines, a variety of graphical formats can be used in the practice of the invention, e.g., the formats used to display correct and incorrect answers.

As other variations, rather than displaying the merged content of the computer readable image, the overlay record, and the student's graded responses on a video monitor, that merged content can be directed to a printer to produce a printed record of the test results which like the video display can serve the function of providing feedback to the student.

Other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A computerized method for reporting test results of a test taken using a bubble sheet comprising:

(a) electronically scanning the bubble sheet;

(b) producing a computer record in a computer storage medium of the test results from the electronic scanning of the bubble sheet of step (a);

(c) merging the computer record of the test results produced in step (b) with a template stored in a computer storage medium, said template comprising a computer readable image of the test; and (d) displaying the merged computer record and template formed in step (c).

2. The computerized method of claim 1 wherein in step (d), the merged computer record and template is displayed on a video monitor.

3. The computerized method of claim 1 wherein in step (d), the merged computer record and template is displayed in printed form.

4. The computerized method of claim 1 wherein the test comprises a plurality of test questions, each question has a plurality of possible answers, and the template comprises coordinates for a plurality of icons, one icon being associated with each possible answer.

5. The computerized method of claim 4 wherein the template comprises the correct answer for each question.

6. The computerized method of claim 4 wherein the template comprises a scoring weight for at least some questions.

7. The computerized method of claim 4 wherein the template comprises a learning objective for at least some questions.

8. The computerized method of claim 1 wherein the bubble sheet comprises user identification data and step (b) comprises verifying the identification data prior to the production of the computer record.

9. An article of manufacture comprising a computer usable medium having computer readable code means embodied therein for performing steps (b) through (d) of claim 1.

10. Apparatus for reporting test results of a test taken using a bubble sheet comprising a programmed computer for performing steps (b) through (d) of claim 1.

* * * * *